(12) United States Patent
Hotelling et al.

(10) Patent No.: US 9,513,673 B2
(45) Date of Patent: *Dec. 6, 2016

(54) WIDE TOUCHPAD ON A PORTABLE COMPUTER

(75) Inventors: Steven P. Hotelling, San Jose, CA (US); Chris Ligtenberg, San Carlos, CA (US); Duncan Kerr, San Francisco, CA (US); Bartley K. Andre, Menlo Park, CA (US); Joshua A. Strickon, San Jose, CA (US); Brian Q. Huppi, San Francisco, CA (US); Imran Chaudhri, San Francisco, CA (US); Greg Christie, San Jose, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 13/351,096

(22) Filed: Jan. 16, 2012

(65) Prior Publication Data

US 2012/0113009 A1    May 10, 2012

Related U.S. Application Data

(63) Continuation of application No. 11/731,118, filed on Mar. 30, 2007, now Pat. No. 8,098,233, which is a continuation of application No. 10/927,575, filed on Aug. 25, 2004, now Pat. No. 7,834,855.

(51) Int. Cl.
*G06F 3/041* (2006.01)
*G06F 1/16* (2006.01)
(Continued)

(52) U.S. Cl.
CPC ............. *G06F 1/169* (2013.01); *G06F 1/1616* (2013.01); *G06F 1/1684* (2013.01); *G06F 3/03547* (2013.01); *G06F 3/04883* (2013.01); *G06F 3/04886* (2013.01)

(58) Field of Classification Search
CPC .......... G06F 3/02; G06F 3/041; G06F 3/044; G06F 1/1616; G06F 1/1684; G06F 1/169; G06F 3/03547; G06F 3/04883; G06F 3/04886
USPC .................................................. 345/168–178
See application file for complete search history.

(56) References Cited

U.S. PATENT DOCUMENTS

| 4,346,376 A | 8/1982 | Mallos |
| 4,658,690 A | 4/1987 | Aitken et al. |

(Continued)

FOREIGN PATENT DOCUMENTS

| EP | 1 691 263 A1 | 8/2006 |
| GB | 2 344 894 A | 6/2000 |

(Continued)

OTHER PUBLICATIONS

Apple Computer, Inc., "Trackpad," Apple Developer Connection (last updated Apr. 19, 2004), downloaded from the Internet on Aug. 19, 2004 from: http://developer.apple.com/documentation/Hardware/Developer_Notes/Macintosh_CPUs- . . . .
PCT Invitation to Pay Additional Fees for PCT International Appln. No. US2005/029476, mailed Dec. 20, 2005 (5 pages).

(Continued)

*Primary Examiner* — Jimmy H Nguyen
(74) *Attorney, Agent, or Firm* — Morrison and Foerster LLP

(57) ABSTRACT

In one exemplary embodiment, a portable computer having a display assembly coupled to a base assembly to alternate between a closed position and an open position. Palm rest areas are formed by a touchpad disposed on the surface of the base assembly. In an alternative embodiment, a touchpad disposed on the base assembly has a width that extends substantially into the palm rests areas of the base assembly.

20 Claims, 10 Drawing Sheets

(51) Int. Cl.
*G06F 3/0354* (2013.01)
*G06F 3/0488* (2013.01)

(56) References Cited

U.S. PATENT DOCUMENTS

| | | | |
|---|---|---|---|
| 5,434,757 A | 7/1995 | Kashiwagi | |
| 5,481,278 A | 1/1996 | Shigematsu et al. | |
| 5,483,261 A | 1/1996 | Yasutake | |
| 5,488,204 A | 1/1996 | Mead et al. | |
| 5,495,077 A | 2/1996 | Miller et al. | |
| 5,541,372 A | 7/1996 | Baller et al. | |
| 5,563,632 A | 10/1996 | Roberts | |
| 5,591,945 A | 1/1997 | Kent | |
| 5,764,218 A | 6/1998 | Della Bona et al. | |
| 5,767,457 A | 6/1998 | Gerpheide et al. | |
| 5,821,922 A | 10/1998 | Sellers | |
| 5,825,352 A | 10/1998 | Bisset et al. | |
| 5,835,079 A | 11/1998 | Shieh | |
| 5,856,822 A | 1/1999 | Du et al. | |
| 5,864,334 A | 1/1999 | Sellers | |
| 5,880,411 A | 3/1999 | Gillespie et al. | |
| 5,943,052 A | 8/1999 | Allen et al. | |
| 5,963,671 A | 10/1999 | Comerford et al. | |
| 5,996,080 A | 11/1999 | Silva et al. | |
| 6,118,435 A | 9/2000 | Fujita et al. | |
| 6,154,210 A | 11/2000 | Anderson | |
| 6,188,391 B1 | 2/2001 | Seely et al. | |
| 6,216,988 B1 | 4/2001 | Hsu et al. | |
| 6,243,080 B1 | 6/2001 | Molne | |
| 6,246,395 B1 | 6/2001 | Goyins et al. | |
| 6,266,050 B1 | 7/2001 | Oh et al. | |
| 6,310,610 B1 | 10/2001 | Beaton et al. | |
| 6,323,846 B1* | 11/2001 | Westerman et al. | 345/173 |
| 6,336,614 B1 | 1/2002 | Kwitek | |
| 6,337,678 B1 | 1/2002 | Fish | |
| 6,369,803 B2 | 4/2002 | Brisebois et al. | |
| 6,459,424 B1 | 10/2002 | Resman | |
| 6,492,979 B1 | 12/2002 | Kent et al. | |
| 6,504,530 B1 | 1/2003 | Wilson et al. | |
| 6,610,936 B2 | 8/2003 | Gillespie et al. | |
| 6,611,253 B1 | 8/2003 | Cohen | |
| 6,654,001 B1 | 11/2003 | Su | |
| 6,690,387 B2 | 2/2004 | Zimmerman et al. | |
| 6,747,636 B2 | 6/2004 | Martin | |
| 6,756,971 B1 | 6/2004 | Ramey et al. | |
| 6,819,312 B2 | 11/2004 | Fish | |
| 6,943,705 B1 | 9/2005 | Bolender et al. | |
| 6,943,779 B2 | 9/2005 | Satoh | |
| 6,958,749 B1 | 10/2005 | Matsushita et al. | |
| 7,015,894 B2 | 3/2006 | Morohoshi | |
| 7,038,659 B2 | 5/2006 | Rajkowski | |
| 7,046,230 B2 | 5/2006 | Zadesky et al. | |
| 7,148,882 B2 | 12/2006 | Kamrath et al. | |
| 7,176,902 B2 | 2/2007 | Peterson et al. | |
| 7,184,064 B2 | 2/2007 | Zimmerman et al. | |
| 7,277,087 B2 | 10/2007 | Hill et al. | |
| 7,289,111 B2 | 10/2007 | Asbill | |
| 7,345,670 B2 | 3/2008 | Armstrong | |
| 7,499,040 B2 | 3/2009 | Zadesky et al. | |
| 7,561,146 B1 | 7/2009 | Hotelling | |
| 7,633,076 B2 | 12/2009 | Huppi et al. | |
| 7,639,233 B2 | 12/2009 | Marks | |
| 7,663,607 B2 | 2/2010 | Hotelling et al. | |
| 7,746,325 B2 | 6/2010 | Roberts | |
| 7,834,855 B2 | 11/2010 | Hotelling et al. | |
| 7,852,199 B2 | 12/2010 | Desai et al. | |
| 7,911,455 B2 | 3/2011 | Nishikawa et al. | |
| 7,986,307 B2 | 7/2011 | Zotov et al. | |
| 8,072,439 B2 | 12/2011 | Hillis et al. | |
| 8,098,233 B2 | 1/2012 | Hotelling et al. | |
| 8,253,698 B2 | 8/2012 | Chen et al. | |
| 8,294,047 B2 | 10/2012 | Westerman et al. | |
| 2002/0080123 A1 | 6/2002 | Kennedy et al. | |
| 2002/0158838 A1* | 10/2002 | Smith et al. | 345/156 |
| 2003/0095095 A1 | 5/2003 | Pihlaja | |
| 2003/0206162 A1 | 11/2003 | Roberts | |
| 2004/0104894 A1 | 6/2004 | Tsukada et al. | |
| 2004/0108994 A1 | 6/2004 | Kato | |
| 2004/0119744 A1 | 6/2004 | Chan | |
| 2004/0227736 A1 | 11/2004 | Kamrath et al. | |
| 2004/0233624 A1 | 11/2004 | Aisenberg | |
| 2005/0024341 A1 | 2/2005 | Gillespie et al. | |
| 2005/0052425 A1 | 3/2005 | Zadesky et al. | |
| 2005/0078093 A1 | 4/2005 | Peterson et al. | |
| 2005/0146512 A1 | 7/2005 | Hill et al. | |
| 2005/0162406 A1 | 7/2005 | Ono et al. | |
| 2006/0022956 A1 | 2/2006 | Lengeling et al. | |
| 2006/0026521 A1 | 2/2006 | Hotelling et al. | |
| 2006/0033701 A1 | 2/2006 | Wilson | |
| 2006/0038796 A1 | 2/2006 | Hinckley et al. | |
| 2006/0052885 A1 | 3/2006 | Kong | |
| 2006/0066588 A1 | 3/2006 | Lyon et al. | |
| 2006/0097991 A1 | 5/2006 | Hotelling et al. | |
| 2006/0109252 A1 | 5/2006 | Kolmykov-Zotov et al. | |
| 2006/0197753 A1 | 9/2006 | Hotelling | |
| 2006/0228149 A1 | 10/2006 | Harley | |
| 2006/0238522 A1 | 10/2006 | Westerman et al. | |
| 2006/0256090 A1 | 11/2006 | Huppi | |
| 2006/0284836 A1 | 12/2006 | Philipp | |
| 2007/0075965 A1 | 4/2007 | Huppi et al. | |
| 2007/0152976 A1 | 7/2007 | Townsend et al. | |
| 2007/0152983 A1 | 7/2007 | McKillop et al. | |
| 2007/0182722 A1 | 8/2007 | Hotelling et al. | |
| 2007/0247429 A1 | 10/2007 | Westerman | |
| 2008/0012835 A1 | 1/2008 | Rimon et al. | |
| 2008/0012838 A1 | 1/2008 | Rimon | |
| 2008/0062144 A1 | 3/2008 | Shahoian et al. | |
| 2008/0136788 A1 | 6/2008 | Nishikawa et al. | |
| 2008/0136792 A1 | 6/2008 | Peng et al. | |
| 2008/0158145 A1 | 7/2008 | Westerman | |
| 2008/0158172 A1 | 7/2008 | Hotelling et al. | |
| 2008/0158181 A1 | 7/2008 | Hamblin et al. | |
| 2008/0158185 A1 | 7/2008 | Westerman | |
| 2008/0196945 A1 | 8/2008 | Konstas | |
| 2008/0202824 A1 | 8/2008 | Philipp et al. | |
| 2009/0101417 A1 | 4/2009 | Suzuki et al. | |
| 2009/0174679 A1 | 7/2009 | Westerman | |
| 2009/0244092 A1 | 10/2009 | Hotelling | |
| 2009/0284495 A1 | 11/2009 | Geaghan et al. | |
| 2009/0322351 A1 | 12/2009 | McLeod | |
| 2010/0099394 A1 | 4/2010 | Hainzl | |
| 2010/0139990 A1 | 6/2010 | Westerman et al. | |
| 2010/0141603 A1 | 6/2010 | Hotelling | |
| 2011/0163996 A1 | 7/2011 | Wassvik et al. | |
| 2012/0019468 A1 | 1/2012 | Westerman et al. | |
| 2012/0023459 A1 | 1/2012 | Westerman et al. | |

FOREIGN PATENT DOCUMENTS

| | | |
|---|---|---|
| GB | 2 402 105 | 12/2004 |
| JP | 61-075981 A | 4/1986 |
| JP | 6289969 A | 10/1994 |
| JP | 07-073278 A | 3/1995 |
| JP | 10-003349 A | 1/1998 |
| JP | 10-289061 A | 10/1998 |
| JP | 10-293644 A | 11/1998 |
| JP | 11194883 A | 7/1999 |
| JP | 11-327788 A | 11/1999 |
| JP | 2000-039964 A | 2/2000 |
| JP | 2000-163031 A | 6/2000 |
| JP | 2000-163031 A | 6/2000 |
| JP | 2000-194507 A | 7/2000 |
| JP | 2002-287889 A | 10/2002 |
| JP | 2002-287903 A | 10/2002 |
| JP | 2002-342033 A | 11/2002 |
| JP | 2002-342033 A | 11/2002 |
| JP | 2003-173237 A | 6/2003 |
| JP | 2005-082806 A | 3/2005 |
| JP | 2007-242035 A | 9/2007 |
| JP | 2008-140182 A | 6/2008 |
| KR | 2004-0103125 A | 12/2004 |
| WO | WO 92/11623 | 7/1992 |
| WO | WO 98/43202 A1 | 10/1998 |
| WO | WO 2004/025449 A2 | 3/2004 |

(56) References Cited

FOREIGN PATENT DOCUMENTS

| WO | WO-2006/026183 A2 | 3/2006 |
| WO | WO-2006/026183 A3 | 3/2006 |
| WO | WO-2007/089766 A2 | 8/2007 |
| WO | WO-2007/089766 A3 | 8/2007 |
| WO | WO 2009/088672 A2 | 7/2009 |

OTHER PUBLICATIONS

PCT International Search Report and Written Opinion for PCT International Appln. No. US2005/029467, mailed Apr. 10, 2006 (15 pages).
Synaptics, "Touchpad Advanced Features," downloaded from the Internet on Aug. 16, 2004 from: http://www.synaptics.com/products/touchpad_features.cfm (2 pages).
Office Action for Chinese Patent Application No. 200580027691.3, mailed Jun. 20, 2008, 4 pages.
Office Action for Chinese Patent Application No. 200580027691.3, mailed Mar. 27, 2009, 4 pages.
Office Action for Chinese Patent Application No. 200580027691.3, mailed Sep. 4, 2009, 4 pages.
Communication for EP Patent Application No. 05788888.5-2224, mailed Sep. 1, 2008, 3 pages.
Communication for EP Patent Application No. 05788888.5-2224, mailed Sep. 4, 2007, 2 pages.
Oral Proceedings for EP Patent Application No. 05788888.5-2224, mailed Nov. 16, 2009, 11 pages.
Oral Proceedings Summons for EP Patent Application No. 05788888.5-2224, mailed Mar. 18, 2009, 3 pages.
PCT International Preliminary Report and Written Opinion for PCT International Appliation No. US2005/029467, mailed Mar. 8, 2007, 8 pages.
Apple Computer, Inc., "Block Diagram and Buses" Apple Developer Connection, Aug. 3, 2004 downloaded from the Internet from: http://developer.apple.com/documentation/Hardware/Developer_Notes/Macintosh_CPUs-G . . . (4 pages).
Apple Computer, Inc., "PowerBook G4"Technology Overview, Apr. 2004 (29 pages).
TouchPad Advanced Features, Synaptics, "Enriching the interaction between humans and intelligent devices" Downloaded Aug. 16, 2004 (2 pages), http://www.synaptics.com/products/touchpad_features.cfm.
Final Office Action mailed Feb. 5, 2008, for U.S. Appl. No. 11/731,118, filed Mar. 30, 2007, nine pages.
Final Office Action mailed Mar. 26, 2008, for U.S. Appl. No. 10/927,575, filed Aug. 25, 2004, 25 pages.
Final Office Action mailed Mar. 4, 2009, for U.S. Appl. No. 11/731,118, filed Mar. 30, 2007, eight pages.
Final Office Action mailed Mar. 5, 2009, for U.S. Appl. No. 10/927,575, filed Aug. 25, 2004, 16 pages.
Final Office Action mailed Jan. 25, 2010, for U.S. Appl. No. 11/731,118, filed Mar. 30, 2007, nine pages.
Final Office Action mailed Mar. 2, 2010, for U.S. Appl. No. 10/927,575, filed Aug. 25, 2004, 16 pages.
Non-Final Office Action mailed Aug. 22, 2007, for U.S. Appl. No. 10/927,575, filed Aug. 25, 2004, 21 pages.
Non-Final Office Action mailed Aug. 22, 2007, for U.S. Appl. No. 11/731,118, filed Mar. 30, 2007, seven pages.
Non-Final Office Action mailed Jul. 24, 2008, for U.S. Appl. No. 11/731,118, filed Mar. 30, 2007, 14 pages.
Non-Final Office Action mailed Sep. 17, 2008, for U.S. Appl. No. 10/927,575, filed Aug. 25, 2004, 14 pages.
Non-Final Office Action mailed Aug. 3, 2009, for U.S. Appl. No. 11/731,118, filed Mar. 30, 2007, 10 pages.
Non-Final Office Action mailed Sep. 1, 2009, for U.S. Appl. No. 10/927,575, filed Aug. 25, 2004, 17 pages.
Notice of Allowance mailed Jul. 12, 2010, for U.S. Appl. No. 10/927,575, filed Aug. 25, 2004, four pages.
Notice of Allowance mailed Sep. 14, 2011, for U.S. Appl. No. 11/731,118, filed Mar. 30, 2007, seven pages.
European Search Report mailed Dec. 10, 2009, for EP Application No. 08022346.4, filed Dec. 23, 2008, 10 pages.
European Search Report mailed Apr. 24, 2012, for EP Application No. 12160763.4, filed Dec. 23, 2008, 9 pages.
Final Office Action mailed Feb. 24, 2012, for U.S. Appl. No. 13/250,955, filed Sep. 30, 2011, 29 pages.
Final Office Action mailed Mar. 22, 2012, for U.S. Appl. No. 13/251,013, filed Sep. 30, 2011, 18 pages.
Final Office Action mailed Apr. 12, 2012, for U.S. Appl. No. 12/242,772, filed Sep. 30, 2008, 24 pages.
GB Search Report mailed Feb. 17, 2009, for GB Application No. 0823047.6, filed Dec. 18, 2008, 2 pages.
GB Combined Examination and Search Report mailed Nov. 25, 2010, for GB Application No. 1018237.6, filed Dec. 18, 2008, 6 pages.
International Preliminary Report on Patentability mailed Sep. 3, 2010, for PCT/US2008/087041, 14 pages.
International Search Report mailed Dec. 30, 2009, for PCT/US2008/087041, filed Dec. 16, 2008, 6 pages.
Lee, S.K. et al. (Apr. 1985). "A Multi-Touch Three Dimensional Touch-Sensitive Tablet," Proceedings of CHI: ACM Conference on Human Factors in Computing Systems, pp. 21-25.
Non-Final Office Action mailed Oct. 12, 2011, for U.S. Appl. No. 12/242,772, filed Sep. 30, 2008, 19 pages.
Office Action for Japanese Patent Application No. 2007-529978, mailed Nov. 1, 2011 9 pages.
Non-Final Office Action mailed Nov. 9, 2011, for U.S. Appl. No. 13/250,955, filed Sep. 30, 2011, 32 pages.
Non-Final Office Action mailed Nov. 17, 2011, for U.S. Appl. No. 13/251,013, filed Sep. 30, 2011, 13 pages.
Non-Final Office Action mailed Feb. 24, 2012, for U.S. Appl. No. 12/242,794, filed Dec. 8, 2008, 7 pages.
Partial European Search Report mailed Sep. 18, 2009, for EP Application No. 08022346.4, filed Dec. 23, 2008, 6 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Written Opinion mailed Dec. 30, 2009, for PCT/US2008/087041, nine pages.
Office Action for Japanese Patent Application No. 2007-529978, mailed Apr. 5, 2011, 2 pages.
Office Action for Japanese Patent Application No. 2007-529978, mailed Jul. 27, 2010 2 pages.
Final Office Action mailed Feb. 14, 2013, for U.S. Appl. No. 12/242,772, filed Sep. 30, 2008, 32 pages.
Notice of Allowance mailed Jan. 24, 2013, for U.S. Appl. No. 13/251,013, filed Sep. 30, 2011, nine pages.
Final Office Action mailed Feb. 20, 2008, for U.S. Appl. No. 10/927,577, filed Aug. 25, 2004, 11 pages.
Final Office Action mailed Sep. 16, 2010, for U.S. Appl. No. 12/479,741, filed Aug. 25, 2004, 11 pages.
Final Office Action mailed Jul. 27, 2012, for U.S. Appl. No. 12/479,741, filed Aug. 25, 2004, 14 pages.
Non-Final Office Action mailed Sep. 10, 2007, for U.S. Appl. No. 10/927,577, filed Aug. 25, 2004, 10 pages.
Non-Final Office Action mailed Jul. 31, 2008, for U.S. Appl. No. 10/927,577, filed Aug. 25, 2004, 11 pages.
Non-Final Office Action mailed Apr. 1, 2010, for U.S. Appl. No. 12/479,741, filed Aug. 25, 2004, 12 pages.
Non-Final Office Action mailed Jan. 4, 2012, for U.S. Appl. No. 12/479,741, filed Aug. 25, 2004, 17 pages.
Non-Final Office Action mailed Feb. 6, 2012, for U.S. Appl. No. 12/691,702, filed Jan. 21, 2010, 13 pages.
Non-Final Office Action mailed Sep. 12, 2012, for U.S. Appl. No. 13/251,013, filed Sep. 30, 2011, 22 pages.

(56) References Cited

OTHER PUBLICATIONS

Non-Final Office Action mailed Oct. 11, 2012, for U.S. Appl. No. 12/242,772, filed Sep. 30, 2008, 19 pages.

Notice of Allowance mailed Mar. 6, 2009, for U.S. Appl. No. 10/927,577, filed Aug. 25, 2004, seven pages.

Notice of Allowance mailed Jun. 26, 2012, for U.S. Appl. No. 12/242,794, filed Dec. 8, 2008, 10 pages.

* cited by examiner

WIDE TOUCHPAD ON A PORTABLE COMPUTER

This application is a continuation of U.S. patent application Ser. No. 11/731,118, filed on Mar. 30, 2007, now U.S. Pat. No. 8,098,233 which is a continuation of U.S. patent application Ser. No. 10/927,575, filed on Aug. 25, 2004, now U.S. Pat. No. 7,834,855.

TECHNICAL FIELD

The invention relates generally to portable computers, and in one embodiment, a portable computer having a wide touchpad.

BACKGROUND

Advances in technology have enabled the size of personal computers to decrease. As a result, the use of portable computers, such as notebook computers, laptop computers, and notepad computers, is rapidly increasing. The portability of notebook computers and notepad computers enables a user to keep his or her computer readily accessible such that computing resources are effectively always at hand. FIG. 1 illustrates a typical notebook computer with two folding halves, with a display assembly in one half and a base assembly with input devices in the other half. Input devices include, among other things, a keyboard for inputting data and a touchpad for navigating a cursor control. Palm rest areas are areas positioned on the upper surface of the base assembly below the keyboard. They allow a user to rest the base or palm of his or her hands comfortably during typing activity. The vast majority of conventional touchpads that are integrated into portable computers are, in one way or another, isolated from unwanted contact with the user's hands (e.g., during a typing activity). This is usually done by centering the touchpad below the keyboard, and minimizing the size of the touchpad, for example, by not extending the touchpad to the palm rest areas to be formed on either side of the touchpad. The touchpad is also recessed beneath the plane of the palm rest, so that palms, the most common cause of unwanted activation of the touchpad, do not come in contact with the touchpad.

One trend in portable computers has been to make them as desktop computer replacements, which requires them to be larger, while still maintaining their portability features. The display assembly in particular, that includes a display screen, has become larger, to become comparable to the sizes of desktop computer monitors. This has caused the housing of the base assembly to increase proportionally. Large base assembly housings can easily accommodate full-size keyboards, but the size of the touchpads must still be limited because of the high risk of unwanted activation, as discussed above, as well as providing the necessary space for palm rests.

Moreover, in order for larger portable computers to be practical for portability purposes, they must still be relatively thin and light. One conventional method to reduce the overall thickness of portable computers is to mount the touchpad flush with the top surface of the base assembly housing (e.g., the palm rest areas). However, this increases the likelihood of accidental brushing by a user's palms, especially during typing.

SUMMARY

Embodiments of a portable computer having one or more input devices including a keyboard and an enlarged or wide touchpad are described herein. A portable computer includes a display assembly and a base assembly coupled by hinge assembly that allows display assembly to change (i.e., rotate) between an open position and a closed position. The display assembly includes a display screen which displays images, data, and a moveable cursor. The wide touchpad and keyboard disposed on the base assembly allow a user to interact with the display screen (e.g., enter data). In one embodiment, the wide touchpad may be a cursor control device having the capabilities of conventional computer mouse devices, such as the ability to point, drag, tap, and double tap objects on a graphical user interface, as well as more general purposes such as scrolling, panning, zooming, and rotating images on display screen. The wide touchpad extends into the areas on the surface of the base assembly that are normally reserved for palm rest areas (e.g., flat areas on the surface of the base assembly that support a user's palms and/or wrists while typing).

In one embodiment, the wide touchpad filters each contact or contact patch sensed to either accept the contact as an intentional input command (e.g., cursor control command), or reject the contact as unintentional (e.g., when operating as a palm rest). The wide touchpad can filter multiple contact patches in order to accept a particular contact patch in one area of the touchpad while rejecting a second contact patch elsewhere on the wide touchpad. In one embodiment, a sensor is disposed between the keyboard and touchpad. The sensor defines a planar sensing region extending upwards from the top surface of the base assembly. The sensor detects a user's hand that may be resting on the base assembly with a palm portion making contact with a portion of the wide touchpad and the fingers extending toward keyboard. When this detection is made, any contact made with a corresponding portion of the touchpad is rejected, having been interpreted as unintentional contact by the user. Alternatively, detection of fingers extending toward the keyboard may be evaluated as one of many factors used to decide whether and what significance to accord to contact with the touchpad. For example, other factors may include the profile of the contact with the touchpad, the level of keyboard activity at the time of contact, etc. In this way, the touchpad may effectively serve as a palm rest (e.g., the user may intentionally rest one or more palm or other part of a hand or arm on a portion of the touchpad, which is recognized as an unintentional input) in addition to a functional touchpad when an input is interpreted as being an intentional contact by the user.

There are numerous other embodiments which are described herein, and these embodiments generally relate to portable computers having a wide touchpad and the accepting or rejecting of contact patches on the touchpad based on, in one example, hand location.

BRIEF DESCRIPTION OF THE DRAWINGS

The present invention is illustrated by way of example, and not limitation, in the figures of the accompanying drawings in which.

DETAILED DESCRIPTION

Figure 1:
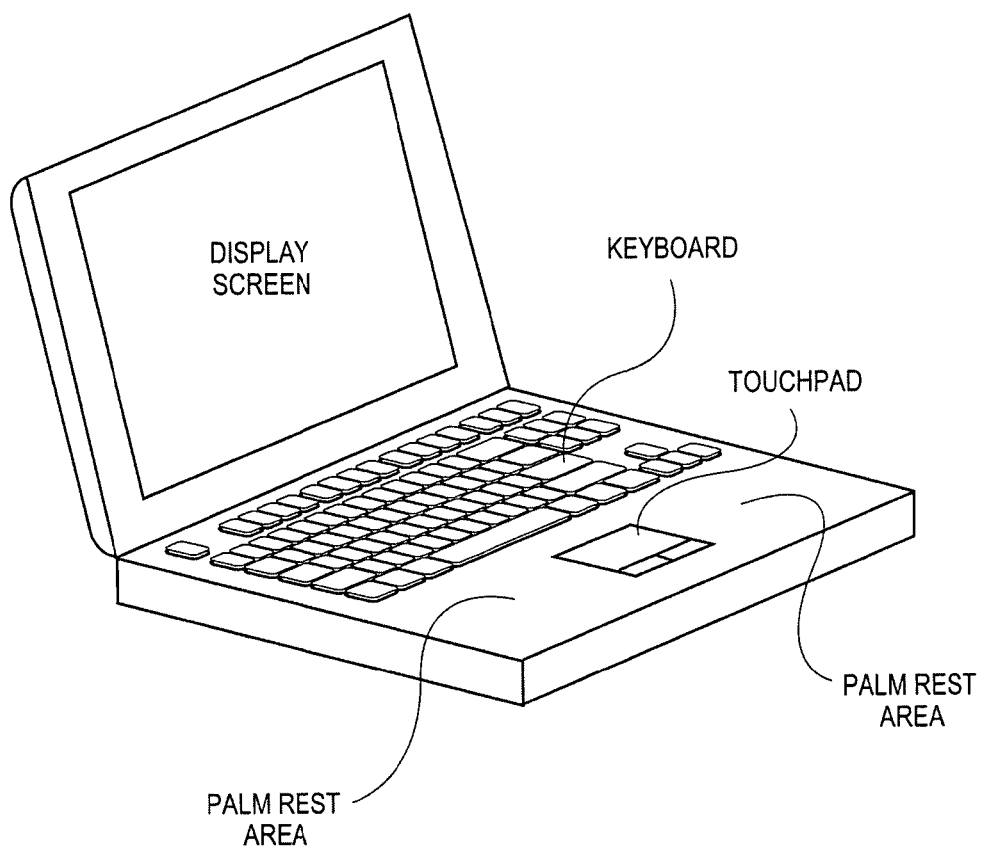
FIG. 1 illustrates a conventional portable computer.

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

The term "coupled" as used herein means connected directly to or indirectly connected through one or more intervening components, structures or elements. The terms "above," "below," and "between" as used herein refer to a relative position of one component or element with respect to other components or elements. As such, one component disposed above or below another component may be directly in contact with the other component or may have one or more intervening component. Moreover, one component disposed between other components may be directly in contact with the other components or may have one or more intervening components.

Various embodiments of a portable computer (also referred to as notebook computer or laptop computer) having enlarged touchpads are described. The touchpad provides input and conventional cursor control capabilities such as pointing, dragging, tapping, scrolling, panning, rotating, and zooming. In one embodiment of the present invention, the touchpad serves as palm rests for a user's hands during a typing activity. In another embodiment of the present invention, the touchpad is enlarged so as to expand along a substantial width of the portable computer base assembly, extending into the palm rest areas. The palm rest areas include those areas on the front, top portion of the base assembly, and the keyboard is located behind the palm rest areas on the base assembly. Thus, in normal use by a user, the palm rest areas are closer to the user than the keyboard, which is normally adjacent to the hinge which couples the base assembly to the display assembly. The palm rest areas typically include a left palm rest area and a right palm rest area with a central portion separating these left and right palm rest areas. In prior art portable computers, this central portion typically includes a touchpad or other cursor control device. Advantages of a large touchpad for a portable computer include increased area for dynamic input ranges, two-handed control of the touchpad, and advanced input based on more than one finger on the touchpad.

In one embodiment, the touchpad possesses the ability to reject accidental contact when a user does not intend to activate the touchpad (e.g., the touchpad is able to distinguish when a user is contacting the touchpad for intended use or is merely resting his or her palms on a particular portion of the touchpad during a typing activity). In one particular embodiment, a sensor is disposed near the touchpad and keyboard of the portable computer to sense hand location of a user, and subsequently determine whether the touchpad contact is intentional or accidental. The touchpad responds properly by either recognizing the action on the touchpad or rejecting the action. As a result, the user is able to work efficiently, allowing for typing and cursor control operations to occur seamlessly. In one embodiment, the enlarged touchpad/palm rest may be suitable for use with portable computers having base and display assemblies (e.g., display frame, base assembly housing) made entirely or partially of metallic materials, in particular, display and base housings made of metals such as steel, aluminum, titanium, or combinations thereof.

Figure 2:
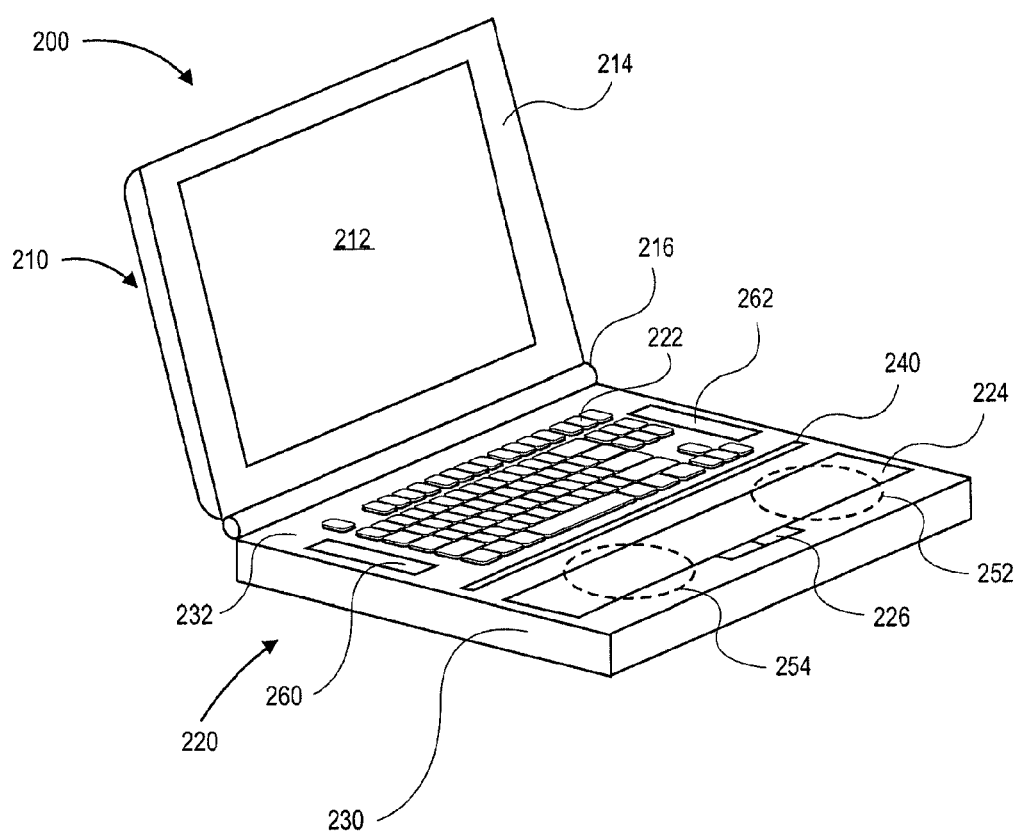
FIG. 2 illustrates one embodiment of a portable computer having a wide touchpad.

FIG. 2 illustrates a perspective view of one embodiment of a portable computer 200 that includes a display assembly 210 and a base assembly 220. Display assembly 210 is coupled to base assembly 220 with a hinge assembly 216 that allows display assembly 210 to change (i.e., rotate) between an open position (as illustrated in FIG. 2) and a closed position (not shown). Display assembly includes a display screen 212 and associated video circuitry (not shown). In one embodiment, display screen 212 may be a liquid crystal display unit. In an alternative embodiment, display screen 212 may be a video monitor or any well know display device. Display screen is centered and framed on display assembly 210 by bezel 214. In the open position, display screen 212 is exposed on display assembly 210. Input devices that include keyboard 222, touchpad 224, and actuation button(s) 226 (e.g., "mouse buttons") are disposed on a top surface 232 of base assembly 220. Speakers 260, 262 may also be disposed on top surface 232 of base assembly 220.

In one embodiment, touchpad 224 may be an input device having the capabilities of conventional computer mouse devices, such as the ability to point, drag, tap, and double tap objects on a graphical user interface, as well as more general purposes such as scrolling, panning, zooming, and rotating images on display screen 212. Touchpad 224, along with keyboard 222 and actuation button 226, allows a user to communicate with portable computer 200 (e.g., interact with display screen 212 or enter data). In one embodiment, a touchpad is defined herein as any two dimensional surface sensor that can detect one or more objects on the touchpad surface (the touchpad input), and output information regarding the location, width, presence, and number of said objects, (the touchpad outputs), in a manner that can be interpreted by the computer system to generate cursor movement, or otherwise interpret a user's either intentional or unintentional input. In one embodiment, touchpad 224 may be a touchpad that utilizes capacitive sensing. The surface of the touchpad may include a grid of conductive metal wires covered by an insulator. When two electrically conductive objects come near each other without touching, their electric fields interact to form capacitance. Also, when another conductive material, such as a human finger, comes in contact with the touchpad surface, a capacitance forms.

The dimensions of touchpad 224, particularly the width (i.e., the distance parallel the row of keys on keyboard 222), are larger than conventional touchpads. In the embodiment illustrated in FIG. 2, touchpad 224 extends into the areas on the surface 232 of base assembly 220 that are normally reserved for palm rest areas (e.g., areas 252, 254, designated by circled hash marks), but still allows a user to rest his or her palms on the surface of touchpad 224. Alternatively, in addition to possessing conventional touchpad functionalities, all or particular portions of touchpad 224 may serve as palm rests for a user's hands. It should be noted that palm rest areas 252, 254 as described herein are not necessarily reserved only for a user's palms during a typing activity as other body parts may be placed on palm rest areas 252, 254. For example, a user's elbow or forearm may rest on any non-keyboard portion of base assembly 220 during use (e.g., leaning on the palm rest portion 254 with the left elbow or forearm while typing with the right hand).

Figure 3:
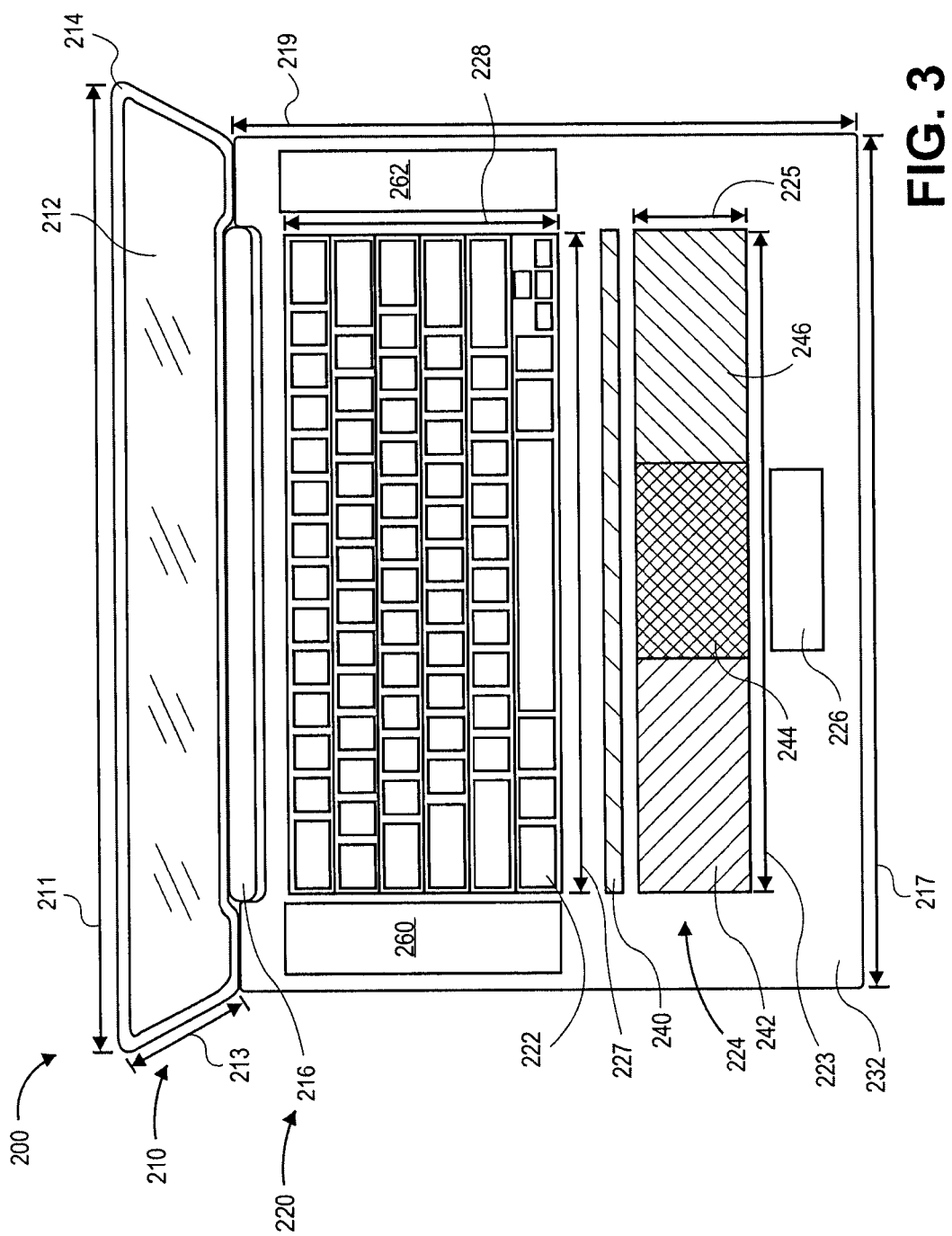
FIG. 3 illustrates a top view of the portable computer of FIG. 2 in the open position with a touchpad that extends into the palm rest areas.

As described in greater detail below, enlarged touchpad 224 is able to reject unintentional contact while accepting intentional contact related to input device functionality (e.g., cursor control commands). In one embodiment, a sensor 240 is disposed between keyboard 222 and touchpad 224. Sensor 240 defines a planar sensing region extending upwards from top surface 232. In one particular embodiment, sensor 240 detects a user's hand that may be resting on base assembly 220 with a palm portion making contact with a portion of touchpad 224 and the fingers extending toward keyboard 222. When this detection is made, any contact made with a corresponding portion of the touchpad is rejected, having been interpreted as unintentional contact by the user. Alternatively, detection of fingers extending toward keyboard 222 may be evaluated as one of many factors used to decide whether and what significance to accord to contact with touchpad 224. For example, other factors may include the profile of the contact with touchpad 224, the level of keyboard 222 activity at the time of contact, etc. In this way, touchpad 224 may effectively serve as a palm rest (e.g., the user may intentionally rest one or more palm or other part of a hand or arm on a portion of the touchpad and the system recognizes this and interprets the input as unintentional) in addition to a functional touchpad when an input is interpreted as being an intentional contact by the user. FIG. 3 illustrates a top view of portable computer 200 in the open position with touchpad 224 that extends into the palm rest areas on top surface 232. In one embodiment, touchpad 224, having particularly wide dimension, is divided into three regions, a left region 242, a center region 244, and a right region 246. Sensor 240, which in one embodiment is a sensor strip having a width substantially similar to a width of touchpad 224, is disposed between keyboard 222 and touchpad 224. The three regions of touchpad 224 may be activated or deactivated selectively, based on a particular touch region or "contact patch" sensed by touchpad 224 in association with the particular region of sensor 240 that detects a hand portion or fingers extending towards the keys of keyboard 222. In an alternative embodiment, only the specific contact patch in a region (and not the entire region) may be accepted or rejected selectively. It will be recognized that other configurations of sensor 240 are possible, for example, sensor 240 may be multiple sensors, or may not be coextensive with touchpad 224.

Figure 4:
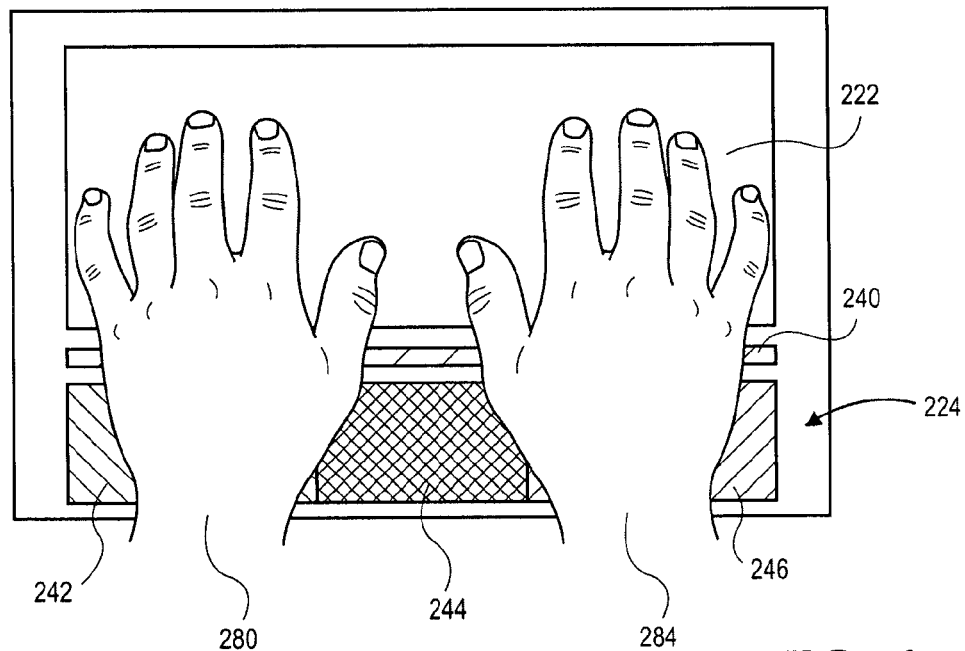
FIG. 4 illustrates one example of a hand position during user activity with a portable computer.
Figure 5:
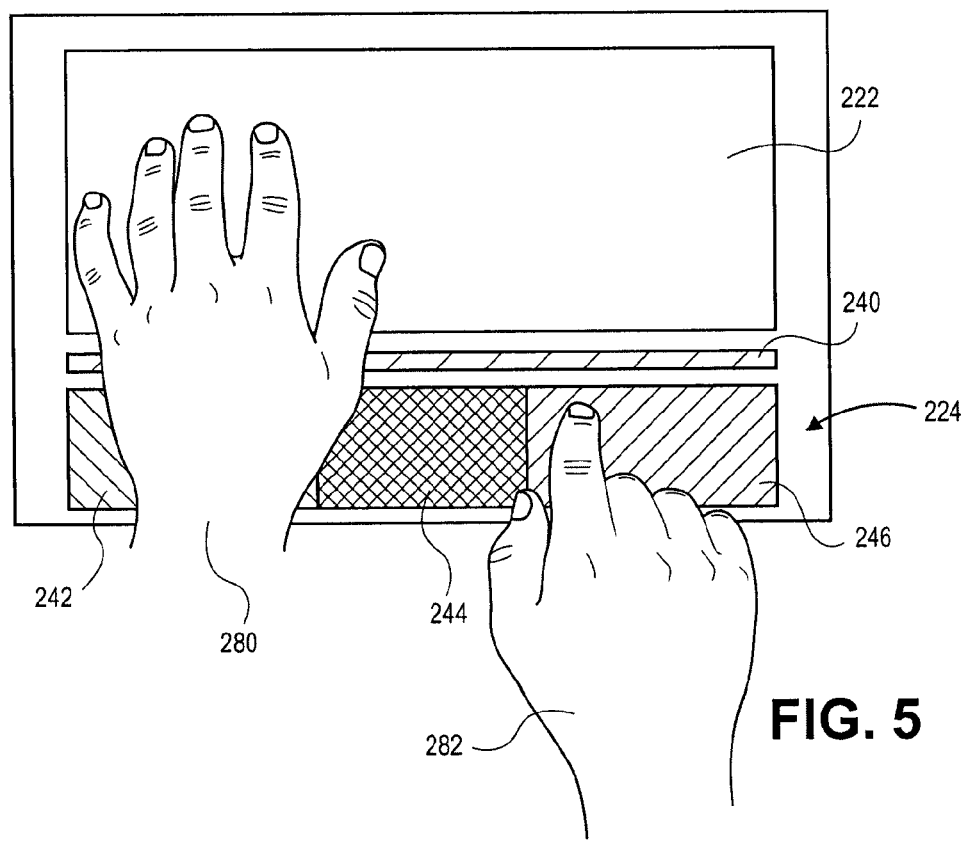
FIG. 5 illustrates another example of a hand position during user activity with a portable computer.
Figure 6:
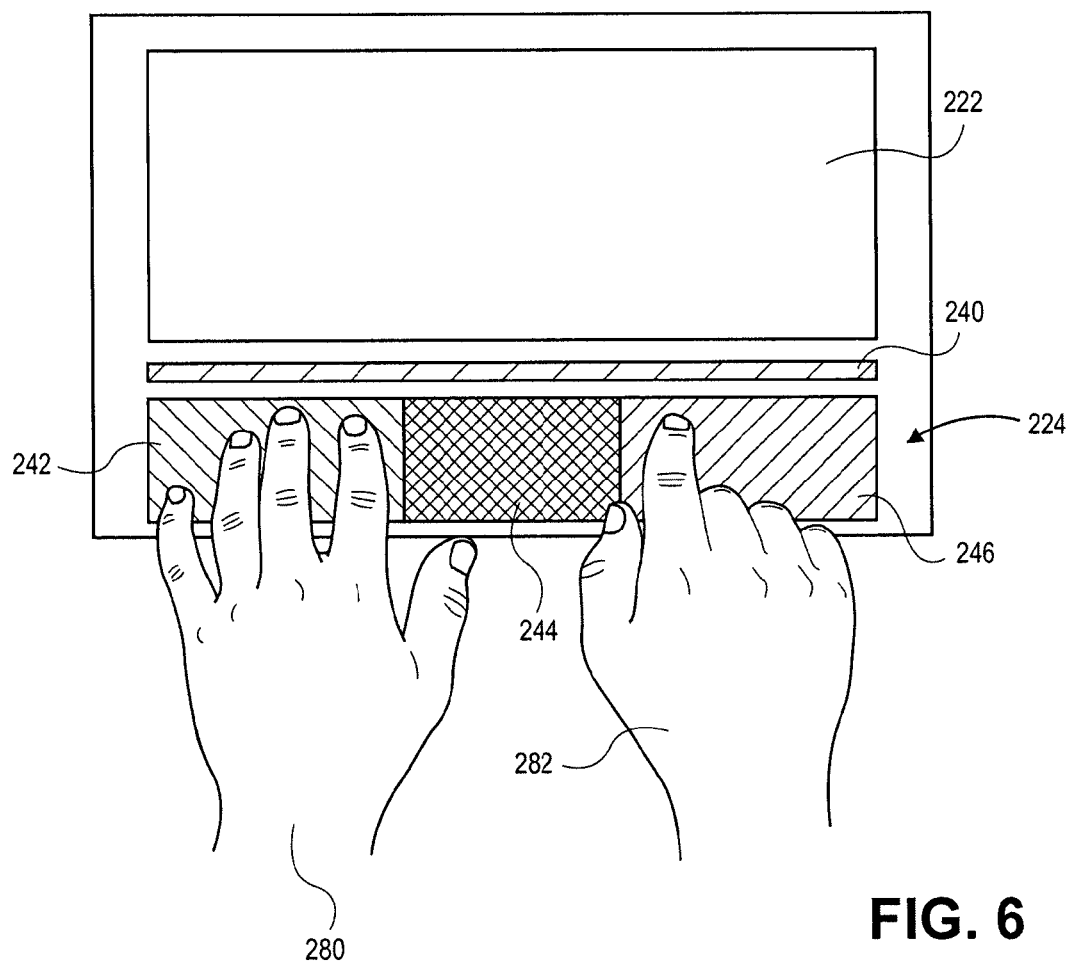
FIG. 6 illustrates another example of a hand position during user activity with a portable computer.

FIGS. 4-6 illustrate three of many possible scenarios (i.e., hand positions) of user activity with portable computer 200 and the recognition by the three regions of touchpad 224 that may either accept or reject contact. FIG. 4 illustrates a typical typing position by a user in which the fingers of left hand 280 and right hand 282 extend over keyboard 222 and both palms rest on regions of touchpad 224. In particular, left hand 280 rests entirely on left region 242, and right hand 282 rests on right region 246. Sensor 240 detects the extension of the fingers from left hand 280 and associates the fingers with the contact made on left region 242. Similarly, sensor 240 associates the fingers from right hand 282 with the contact made on right region 246. Accordingly, the contact patches on left region 242 and right region 246 are not recognized as any form of input or touchpad operation. The user's hands may rest comfortably on these regions of touchpad 224, and in doing so, left region 242 and right region 246 serve as palm rests. In contrast, center region 244 of touchpad 224 may be active and be responsive to touchpad sensing.

FIG. 5 illustrates another scenario in which the fingers of left hand 280 extend over the keys of keyboard 222 while a finger from right hand 282 makes contact with touchpad 224. In this scenario, the contact made by right hand 282 is intentional and meant to activate a touchpad action (e.g., pointing, dragging, tapping). Sensor 240 detects the extension of the fingers from left hand 280 and associates the fingers with the contact made on left region 242. For right hand 282, the fingers do not extend over keyboard 222 and no detection is made by sensor 240. Accordingly, the contact patch on left region 242 is not recognized as any form of touchpad operation. However, the contact patch on right region 246 of touchpad 224 is recognized as a valid touchpad activity, and responds with the appropriate touchpad command (e.g., dragging, pointing). The user's left hand 280 may rest comfortably on left region 242 of touchpad 224 and engage in typing activity, while the fingers from right hand 282 engage in touchpad activity. In one embodiment, center region 244 of touchpad 224 may also be active and be responsive to touchpad sensing.

FIG. 6 illustrates a third scenario in which both left hand 280 and right hand 282 do not extend over keyboard 222. This hand position may occur when the user engages only in touchpad activity. In this scenario, portions of left hand 280 rests on left region 242 while a finger from right hand 282 engages in touchpad activity, and no portions from either hand extend over keyboard 222. The contact patch made by the finger of right hand 282 is intentional and meant to activate a touchpad action/input (e.g., pointing, dragging, tapping). The contact patches made by left hand 280 is unintentional. Although no detection is made by sensor 240, touchpad 224 recognizes various characteristics of the contact patches made by the user's hands. In this case, the multiple contact patches recognized in left region 242, taking into consideration the size of the patches and proximity, are interpreted by touchpad 224 as unintentional. Accordingly, the activity in left region 242 is disregarded. Alternatively, all of left region 242 may be inactivated or the inputs are ignored or filtered. However, the single contact patch on right region 246 of touchpad 224 is recognized as a valid touchpad activity, and responds with the appropriate touchpad command (e.g., dragging, pointing). In one embodiment, center region 244 of touchpad 224 may also be active and be responsive to touchpad sensing.

In an alternative embodiment, touchpad 224 is capable of multiple or two-handed input. With reference again to FIG. 6, touchpad 224 may accept the contact patch from the finger of right hand 282 for cursor control operation. The contact patches from left hand 280 may also be accepted when associated with touchpad input device functionality. For example, two fingers from left hand 280 may be used to control scrolling, panning, rotation, and zooming of objects or data on the display screen (e.g., display screen 212).

FIGS. 4-6 illustrate touchpad 224 as being divided into three distinct sensing regions. However, it may be appreciated that any number of sensing regions may be divided over touchpad 224, and not necessarily in the relative dimensions illustrated. For example, sensor 240 can detect the extension and retraction of one finger at a time to that a single finger can be moved back and forth between touchpad 224 and keyboard 222, being active in both places, without moving the entire hand. It will also be recognized that touchpad 224 can be activated/deactivated in portions. It can also be activated/deactivated one input (i.e., contact patch) at a time, by disregarding any particular input that is determined to be related to unintended contact rather than intentional interface activity. That is, touchpad 224 is "deactivated" if it disregards a particular input, even if the next input may be not disregarded.

Figure 7:
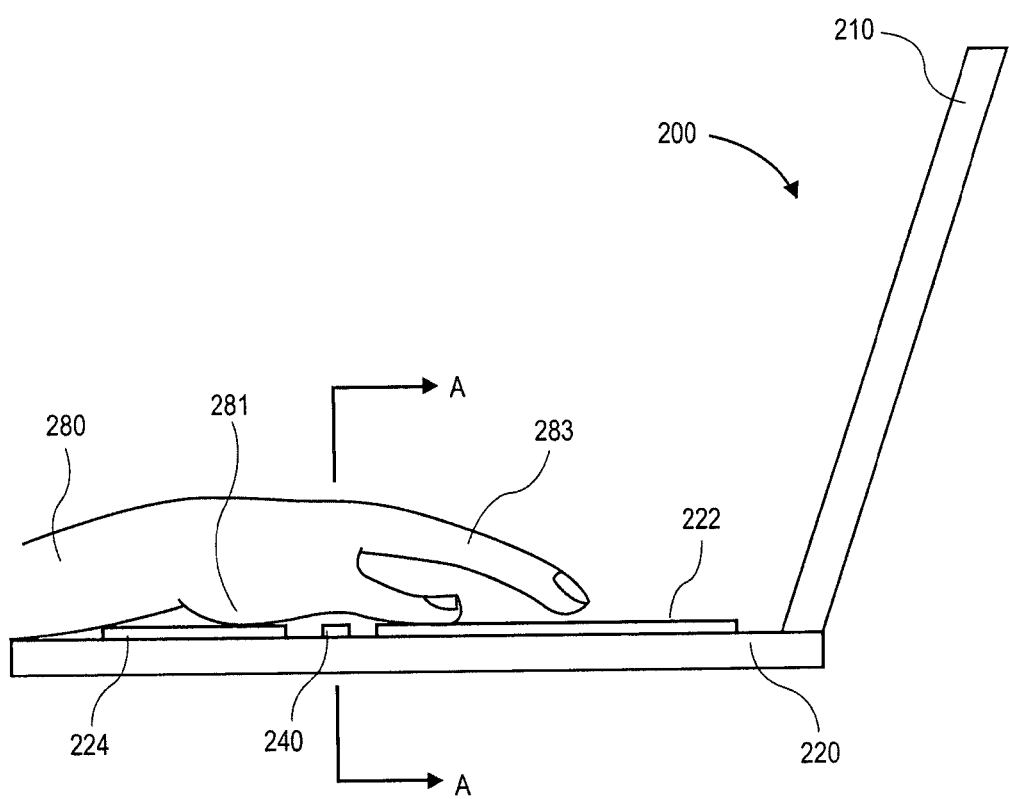
FIG. 7 illustrates a side view of a hand in a typing position with the portable computer of FIG. 2.
Figure 8:
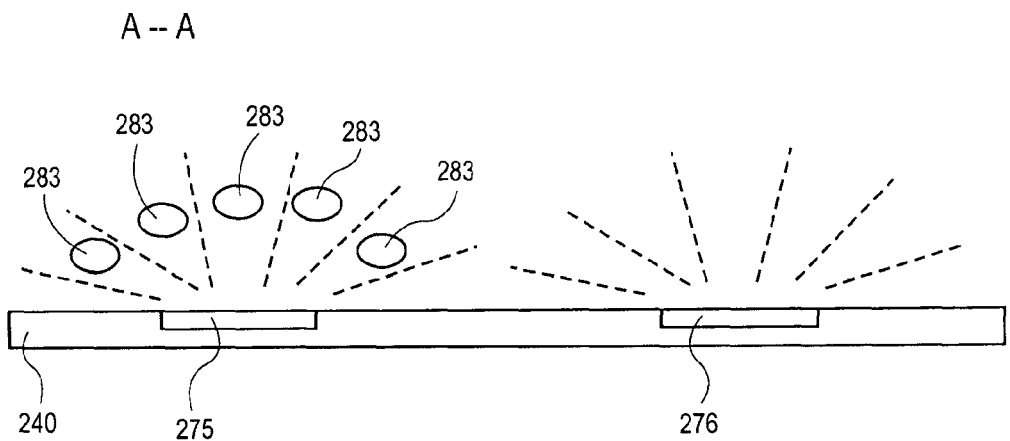
FIG. 8 illustrates a cross-sectional view of FIG. 7 taken along line A-A through the base assembly, sensor, and hand with showing one embodiment of a sensor.
Figure 9:
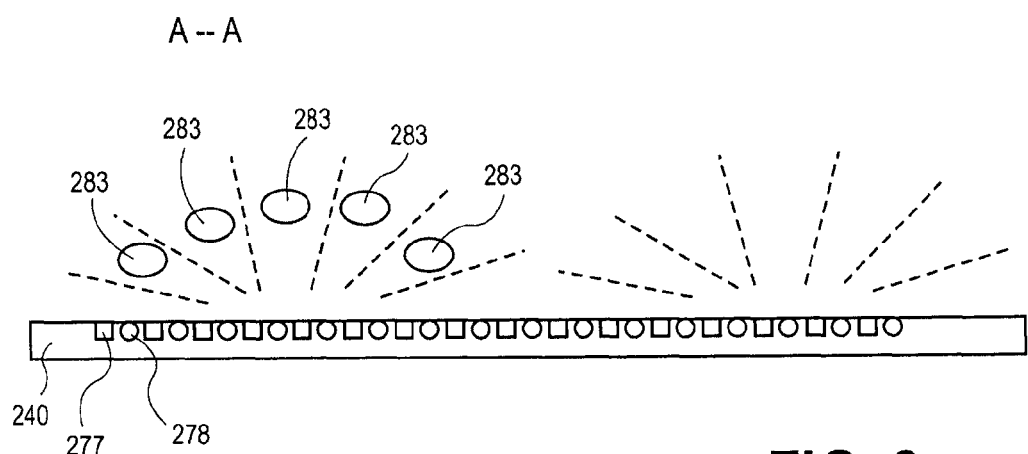
FIG. 9 illustrates a cross-sectional view of FIG. 7 taken along line A-A through the base assembly, sensor, and hand with showing another embodiment of a sensor.

FIGS. 7-9 illustrate in greater detail, in one embodiment, the sensing of a user's fingers over the keys of keyboard 222. In the side view of FIG. 7, left hand 280 is illustrated in a typing position with respect to portable computer 200 in the open position (i.e., display assembly 210 rotated open relative to base assembly 220). Palm 281 rests on touchpad 224, and fingers 283 extend over sensor 240 and keyboard 222. As described above, the palm rest for palm 281 includes touchpad 224 because of the extra-wide or elongated dimensions of touchpad 224. FIG. 8 illustrates a cross-sectional view of FIG. 7 taken along line A-A through base assembly 220, sensor 240, and left hand 280. In one embodiment, sensor 240 includes a first imaging sensor 275 and a second imaging sensor 276. The imaging sensors may be infrared (IR) sensors that look "upward" (designated by the dash lines) and "see" the cross-sectional view of A-A. First and second imaging sensors 275, 276 examine a planar region in space extending upwards from the general line of sensor 240. For example, the fingers 283 of left hand 280 that breaks the planar region examined by first sensor 275. The sensing of fingers 283 may be associated with the contact patch made by palm 281 on touchpad 224 (e.g., on left region 242 as illustrated in FIG. 4), and as a result, either the entire left region 242 would not be active for any type of touchpad operation or the particular contact patch made by the palm 281 would be rejected, allowing for palm 281 to rest on touchpad 224. Because second sensor 276 does not detect any breaks along its portion of the planar region, portions of touchpad 224 associated with second sensor 276 are responsive to touchpad commands or operations (e.g., middle region 244 and right region 246).

FIG. 9 illustrates an alternative embodiment of a sensor mechanism for sensor 240. Multiple optical emitter-detector pairs (e.g., pairs 277, 278) are disposed along the sensor strip area to detect the presence or absence of a user's hand in the sensed plane (i.e., a planar region in space extending upwards from the general line of sensor 240). The results produced by the emitter-detectors pairs are similar to that produced by the IR sensors (e.g., first and second sensors 275, 276) described above with respect to FIG. 8. The fingers 283 of left hand 280 breaks the planar region examined by the emitter-detector pairs 277, 278 near one side of sensor 240. The sensing of fingers 283 may be associated with the contact patch made by palm 281 on touchpad 224 (e.g., on left region 242 as illustrated in FIG. 4), and as a result, either the entire left region 242 would not be active for any type of touchpad operation or the particular contact patch made by the palm 281 would be rejected, allowing for palm 281 to rest on touchpad 224. The emitter-detector pairs 277, 278 do not detect any breaks along the planar region near the other end of fingers 283. Accordingly, portions of touchpad 224 associated with the undetected sensor regions would be responsive to touchpad commands or operations (e.g., middle region 244 and right region 246).

The infrared sensors of first sensor 275 and second sensor 276, as well as optical emitter-detector pairs 277, 278 are just two of many possible sensing mechanism that may be used for detecting a hand location. In alternative embodiments, sensor 240 may be a capacitive sensor or visible light/shadow sensor. It may be appreciated that sensor 240 does not necessarily have to be utilized with an enlarged or wide touchpad, as illustrated, for detecting a hand location. The IR sensors and optical emitter-detector sensors described herein may be associated with touchpad of any dimension (e.g., a touchpad having dimensions comparable to the dimensions of center region 244).

Referring again to FIG. 3, inside base assembly 220, there may be all the essential and well known electronic circuitry for the operation of portable computer 200, such as a central processing unit (CPU), memory, hard disk drive, floppy disk drive, flash memory drive, input/output circuitry, and power supply. Such electronic circuitry for a portable computer is well known in the art; for example, a portable computer is the Macintosh PowerBook from Apple Computer, Inc. of Cupertino, Calif.

Keyboard 222 and touchpad 224 occupy almost all of top surface 232 of base assembly 220. In one embodiment, display assembly 210 has a width 211 and length 213 that is substantially similar to a width 217 and length 219 of base assembly 220 so that when display assembly 210 is closed over base assembly 220, the edges of the two assemblies are flush with each other. In one particular embodiment, portable computer 200 may have a display screen size of about 12 inches (about 305 millimeters (mm), the diagonal distance from one corner to the opposite corner of the display screen). Display assembly width 211 and base assembly width 217 may be about 277 mm and display assembly length 213 and base assembly length 219 may be about 219 mm. Keyboard 222 may be substantially centered along a width of base assembly 220, having a width 227 of about 274 mm and a length 228 of about 108 mm.

In one embodiment, keyboard 222 may be a full-size keyboard (i.e., a keyboard layout having dimensions similar to those of conventional desktop computer keyboards) having a conventional "QWERTY" layout, which also includes a large, elongated space bar key in the bottom row of the keyboard. The specific type of the keyboard (e.g., a "QWERTY" keyboard) that is used is not critical to the present invention.

Touchpad 224 has an elongated width that is substantially similar to a width of keyboard 222. Further, the width of the touchpad may be substantially similar to the width of base assembly 220. For example, the touchpad in certain embodiments may have a width which is about 70 to about 80% of the width of the base assembly. More generally, in other embodiments, the touchpad may have a width which is about 50% to about 95% of the width of the base assembly. Further, a substantial portion (e.g., more than 50% and typically more than 60%) of the palm rest area may include one or more touchpads. The width 223 of touchpad extends along width 227 of keyboard 222 so as to provide a palm rest area during typing activity. In one embodiment, touchpad 224 has a width 223 of about 274 mm and a length 225 of about 45 mm. While touchpad 224 is shown as being one contiguous touchpad, in alternative embodiments, several separate touchpads may be disposed in the left, right, and central palm rest areas, and these several separate touchpads may occupy a substantial portion (e.g., about 60% to about 70%) of the palm rest areas.

In an alternative embodiment, portable computer 200 may have a display screen size of about 17 inches (about 432 mm, the diagonal distance from one corner to the opposite corner of the display screen). Display assembly width 211 and base assembly width 217 may be about 392 mm and display assembly length 213 and base assembly length 219 may be about 259 mm. Keyboard 222 may be a full-sized keyboard that is substantially centered along a width of base assembly 220. Keyboard 222 may have a width 227 of about 274 mm and a length 228 of about 108 mm. Touchpad 224 disposed on base assembly 220 for a 17-inch display screen may have an elongated width that is substantially similar to or exceeds a width of keyboard 222. The width of a base assembly for a 17-inch display screen may be greater compared to that of a base assembly for a 12-inch display screen. Although the dimensions of keyboard 222 may not be substantially different for the two display screen sizes, greater surface area would be provided in the base assembly for the 17-inch display screen. Accordingly, the palm rest areas formed by touchpad 224 may be larger for the 17-inch display screen base assembly. In one embodiment, touchpad 224 has a width 223 between about 274 mm to about 330 mm and a length 225 between about 45 mm to about 55 mm.

The dimensions for keyboard 222, and in particular, for touchpad 224 are examples only and it should be noted that a larger range of dimensions may be utilized, depending, for example, on the size of display screen 212 and the surface area available on the base assembly. In one embodiment, touchpad 224 may have a width 223 between about 100 mm to about 400 mm and a length 225 between about 45 mm to about 200 mm.

Figure 10:
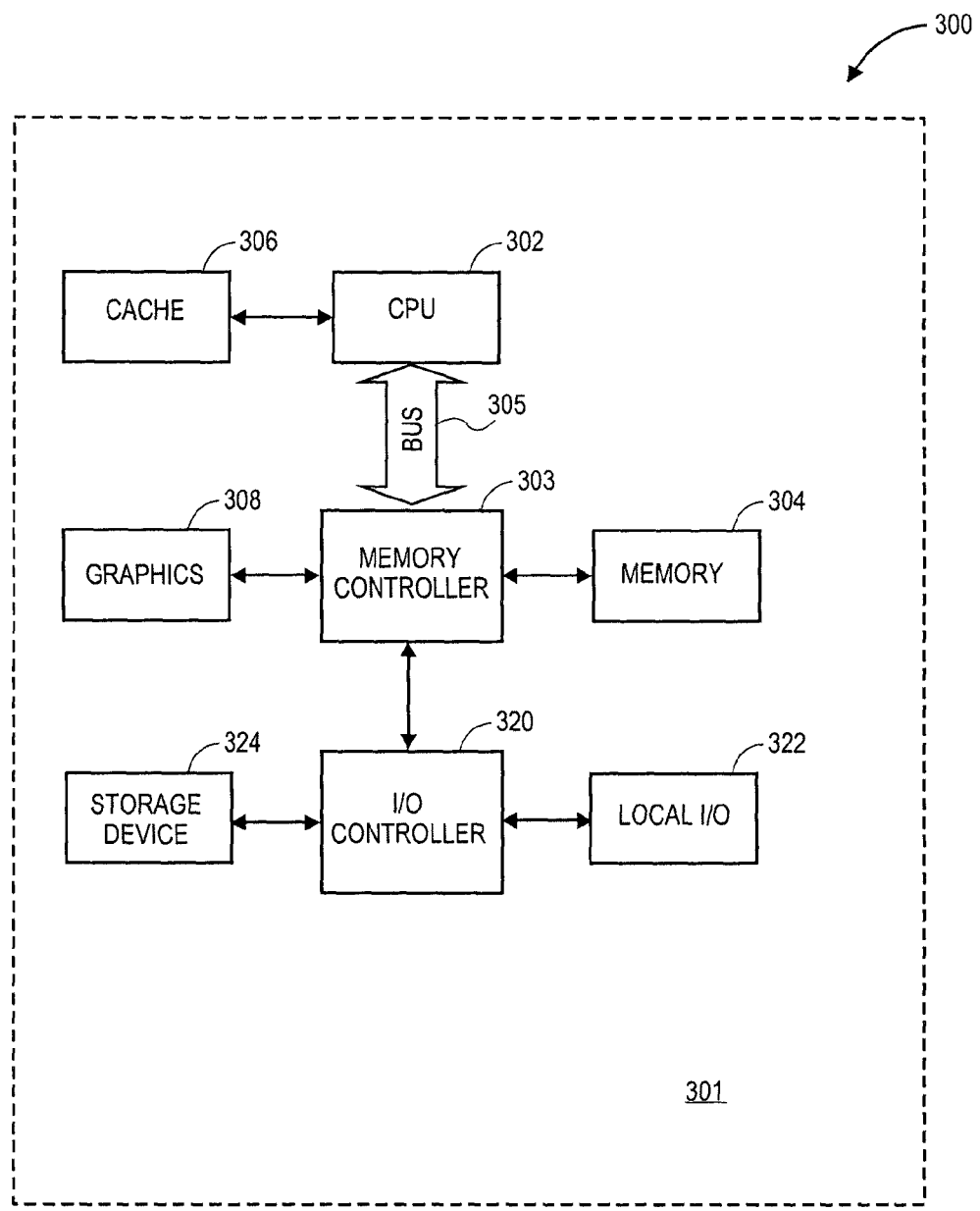
FIG. 10 illustrates a logic diagram of one embodiment of a portable computer system that supports a wide touchpad and/or hand sensor.

FIG. 10 illustrates a logic diagram of one embodiment of a portable computer system 300 (e.g., for portable computer 200) that supports a wide touchpad and/or hand sensor. Note that while FIG. 10 illustrates various components of a computer system, it is not intended to represent any particular architecture or manner of interconnecting the components as such details are not germane to the present invention. In one embodiment, the corresponding hardware components for the components described may be disposed on motherboard 301 as shown. The computer system of FIG. 10 may, for example, be an Apple Macintosh portable computer.

The portable computer system 300 includes a main logic board or motherboard 301 with at least one central processing unit (CPU) or processor 302, and one or more volatile memory units 304 such as random access memory (RAM) and read only memory (ROM), coupled to motherboard 301, as well as a graphics processor 308. More than one processor 302 may be part of system 300 (e.g., a dual processor system, or a dual core processor system). Processor 302 may be, for example, a G4 or G5 microprocessor from Motorola, Inc., or IBM, and is coupled to cache memory 306.

A memory controller 303 allows for the interface of memory unit 304 and graphics processor 308 with CPU 302. Graphics processor 308 is also coupled to a display device (e.g., display screen 212), which may be a high resolution device. Memory controller 303 also defines the speed at which data can flow between CPU 302, memory unit 304, and graphics processor 308 through bus 305. Bus 305 may also be referred to as front side bus (FSB), processor bus, memory bus or system bus. An input/out (I/O) controller 320 manages the interface of other components coupled to motherboard 301 such as storage device 324 (non-volatile), and local I/O 322. Types of I/O devices include mice, modems, network interfaces, printers, scanners, video cameras, and other devices that are well known in the art.

In one embodiment, aspects of the recognition of user's hand location by sensor 240, and either accepting or rejecting a contact patch on touchpad 224 may be embodied, at least in part, in software. That is, the techniques may be carried out in a computer system or other data processing system in response to its processor, such as a microprocessor, executing sequences of instructions contained in a memory, such as memory 304 (which may include ROM, RAM, cache 306, or a remote storage device). In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the CPU 302.

A machine readable medium can be used to store software and data which when executed by a data processing system causes the system to perform various methods of the present invention. This executable software and data may be stored in various places including for example memory 304, cache 306, or storage device 324, as illustrated in FIG. 7. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.), etc.

Figure 11:
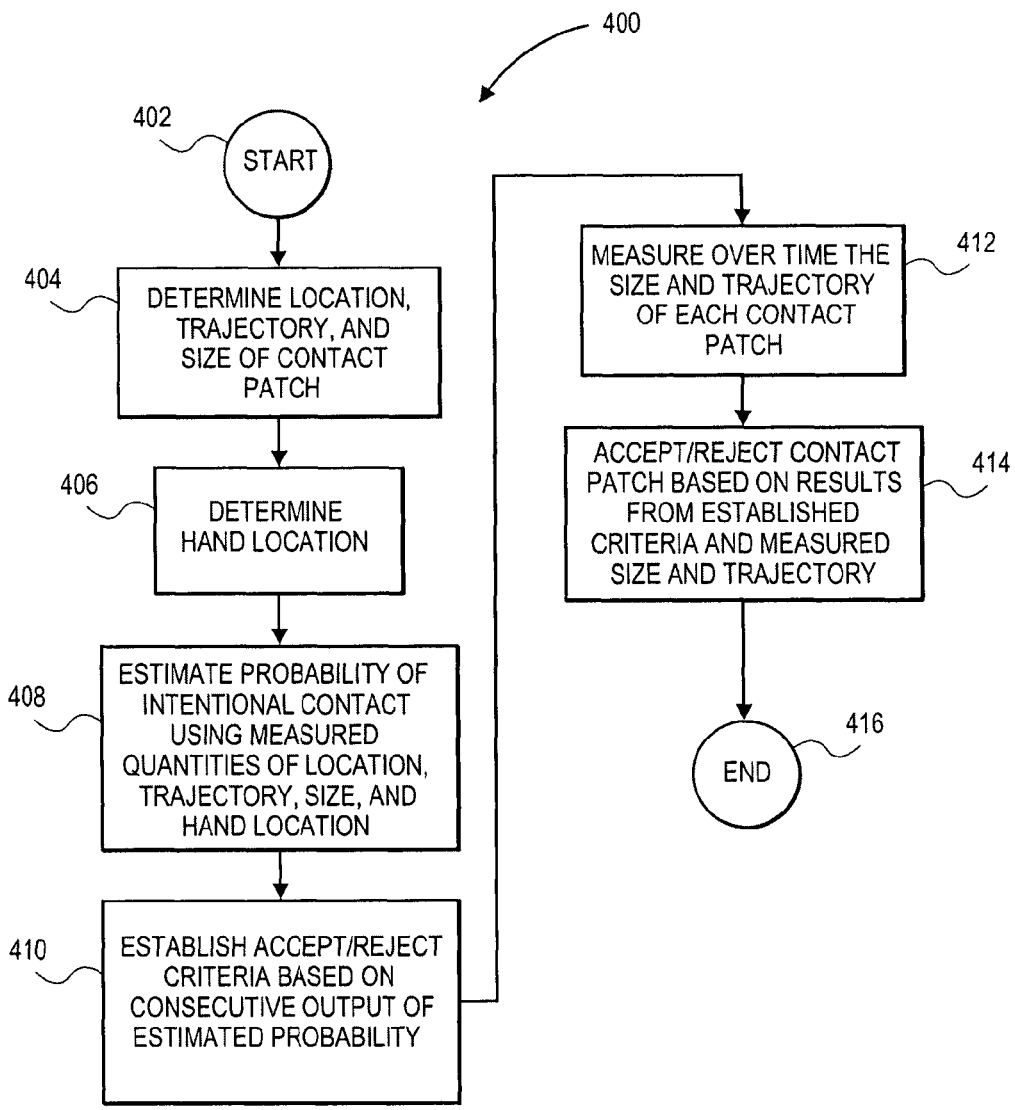
FIG. 11 illustrates a flowchart of one embodiment of an operation for rejecting or accepting a contact patch.

In at least one embodiment of the present invention, a sensor is disposed on the base assembly of a portable computer to detect a hand location. If the hand location extends from a contact patch on the touchpad to the keyboard, that particular contact patch may be recognized by the computer system as an unintentional or accidental contact, and therefore not registered as a touchpad command. FIG. 11 illustrates a flowchart of one embodiment of an operation 400 for rejecting or accepting a contact patch on a touchpad in association with a hand location. The operation may be performed for each contact patch detected on the touchpad. In one embodiment, a capacitive touchpad (e.g., touchpad 224) disposed on a top surface (e.g., surface 232) of a base assembly (e.g., 220) senses a contact patch on the touchpad. Any contact sensed by the touchpad may undergo a post processor algorithm in order interpret the contact properly. In one embodiment, the post processor is defined herein to be the software or firmware that converts the information coming from the touchpad sensor into a format that can be interpreted by the portable computer (e.g., processor 302). The post processor has as inputs, the touchpad outputs, which may include any type of physical contact made with the touchpad. The post processor then uses the "post processor algorithm" to analyze each set of inputs (location, width, number of contacts, presence of contact, and hand location) to determine whether the contact patch should be accepted or rejected.

The starting point 402 of operation 400 may be when the portable computer is in a power "ON" state, with the display screen visible (e.g., displaying an image or data) and the various input devices (e.g., keyboard 222, sensor 240, and touchpad 224) in active and responsive states. When a contact patch is sensed on the touchpad, a location, trajectory, and size of the contact patch are determined, block 404. Trajectory refers to the path of the contact patch (e.g., movement of a finger on the touchpad during a dragging operation). The contact patch may be for example, the palm region of hand during a typing activity (e.g., palm 281 of FIG. 7) or during a pointing activity (e.g., right hand 282 of FIG. 5). Next, a hand location is made using a sensor (e.g., sensor 240) disposed on the base assembly of the portable computer, block 406. In one embodiment, the sensor may include one or more IR sensors (e.g., sensors 275, 276) disposed along a sensor strip between the keyboard and the touchpad. In an alternative embodiment, the sensors may be pairs of optical emitter-detectors (e.g., pairs 277, 278) disposed along a sensor strip between the keyboard and the touchpad.

Once a hand location is determined, a probability of intentional contact is estimated using the measured quantities of the contact patch location, trajectory, size of the contact patch, in addition to the hand location detected by the sensor, block 406. As discussed above, the touchpad may be divided into multiple sensing regions, for example, a left sensor region 242, center sensor region 244, and right sensor region 246 or there may be separate touchpads, one for each of these regions which are separated by small areas which are not touchpads. For example, the size of a contact patch made by palm 281 resting on left sensor region 242 would be larger compared to a contact patch made by a finger moving during a pointing or dragging cursor operation (e.g., finger of right hand 282 over right sensor region 246 illustrated in FIG. 5). In one embodiment, a contact patch having a relatively small size and a trajectory with a certain distance along the surface of the touchpad, coupled with no detection by the sensor would be initially estimated with a high probability of intentional contact. This may correspond to, for example, a pointing or dragging cursor operation. In contrast, a contact patch of a large size, and with no or minimal trajectory, coupled with detection by the sensor, would be initially estimated with a very low probability of intentional contact. This may correspond to a palm resting on the touchpad surface.

The estimated probabilities are repeatedly calculated to establish a narrow or strict accept/reject criteria for the contact patch, block 410, and the contact patch is also measured repeatedly over a period of time, block 412. These calculations are done repeatedly to provide the system with the most recent of sampling data. In one particular embodiment, the measurements may be repeated in the range of about 120 Hz to about 3 Hz. Lastly, the contact patch is accepted or rejected based on the criteria established from the measured contact patch/sensor calculations, block, 414. Once an accept/reject decision has been made, the operation ends, block 416.

The accept/reject operation 400 may further be described with respect to the scenarios in FIGS. 4-5. FIG. 4 illustrates a conventional typing position with the palms of both hands resting on touchpad 224 and fingers extending over keyboard 222. The contact patches made on left sensor region 242 and right sensor region 246 would be rejected. The relatively large sizes of the contact patches made by the palms in connection with the detection of hand location would be interpreted as unintentional or accidental contact. In this position, touchpad 224 operates only as a palm rest. FIG. 5 illustrates a dual mode position in which the left hand 280 is in a typing position and right hand 282 is in a touchpad position. The contact patch from left hand 280 (e.g., the palm) would be rejected because the location of left hand 280 would be detected by sensor 240. Accordingly, either the entire left sensor region 242, which is associated with the location of left hand 280 and the contact patch, or the particular contact patch made by left hand 280 on left sensor region 242 would be rendered inactive for touchpad commands, and operate only as a palm rest. The contact patch made by the finger of right hand 282 would be accepted as an intentional contact. The sensor would not detect any hand presence associated with right sensor region 246. As described above, the calculations performed by operation 400 include measuring the size and trajectory of the contact patch made by right hand 282. A comparison with the contact patch from left hand 280 may also be performed to establish the accept/reject criteria.

Figure 12:
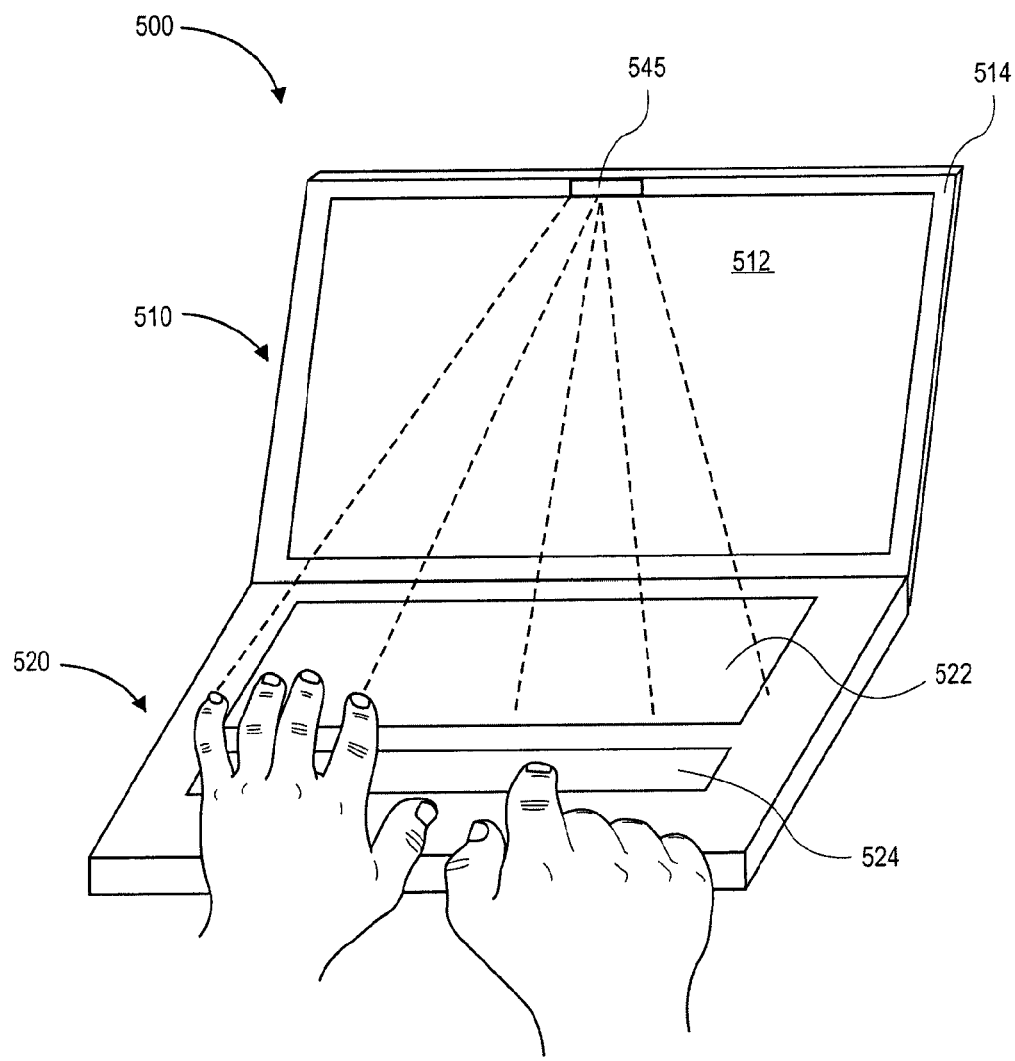
FIG. 12 illustrates an alternative embodiment of a hand detecting sensor that may be disposed on a portable computer.

FIG. 12 illustrates an alternative embodiment of a hand detecting sensor that may be disposed on a portable computer. Portable computer 500 is illustrated in an open position with display assembly 510 rotated open with respect to base assembly 520. Base assembly 520 includes a wide touchpad 524 disposed below keyboard 522. An imaging sensor 545 is disposed on bezel 514 that frames display screen 512. Imaging sensor 545 detects an area of base assembly 520 that includes keyboard 222 and touchpad 524. When activated, imaging sensor 545 may detect a particular hand location and establish accept/reject criteria as described above (e.g., operation 400). In an alternative embodiment, imaging sensor 545 may also provide video-conferencing functionality when not operating as an imaging sensor.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A portable computer, comprising:
   a display assembly coupled to a base assembly;
   a touchpad disposed on the base assembly, wherein the touchpad has a width that is half or greater than half a width of the base assembly and the touchpad includes a plurality of predefined regions, wherein the touchpad can detect an object in contact with a surface at any position on the touchpad within a first predefined region of the plurality of predefined regions; and
   a processor coupled to the touchpad, wherein, in response to the processor determining that the contact is unintentional, the processor deactivates the first predefined region independently of a second predefined region of the plurality of predefined regions.

2. The portable computer of claim 1, wherein the processor estimates a probability that the object detected on the surface of the touchpad is an intentional or unintentional contact based upon determining various characteristics of one or more contact patches on the touchpad.

3. The portable computer of claim 2, wherein the various characteristics include contact patch location, trajectory, and size.

4. The portable computer of claim 1, further comprising:
a keyboard disposed on a top surface of the base assembly, wherein the touchpad has a width that is substantially similar to a width of the keyboard or greater than a width of the keyboard.

5. The portable computer of claim 4, wherein the processor estimates a probability that the object detected on the surface of the touchpad is an unintentional contact based upon detecting when a user's hand is positioned over the keyboard using a sensor disposed between the keyboard and the touchpad.

6. The portable computer of claim 4, wherein the processor estimates a probability that the object detected on the surface of the touchpad is an unintentional contact based upon detecting when a user's hand is positioned over the keyboard using a sensor disposed in the display assembly.

7. The portable computer of claim 1, wherein the touchpad comprises a capacitive sensor touchpad.

8. A portable computer, comprising:
a display assembly coupled to a base assembly;
a touchpad disposed on the base assembly, wherein the touchpad has a width that is between 100 millimeters and 400 millimeters and the touchpad includes a plurality of predefined regions, and wherein the touchpad can detect an object in contact with a surface at any position on the touchpad within a first predefined region of the plurality of predefined regions; and
a processor coupled to the touchpad, wherein, in response to the processor determining that the contact is unintentional, the processor deactivates the first predefined region independently of a second predefined region of the plurality of predefined regions.

9. The portable computer of claim 8, wherein the processor estimates a probability that the object detected on the surface of the touchpad is an intentional or unintentional contact based upon determining various characteristics of one or more contact patches on the touchpad.

10. The portable computer of claim 9, wherein the various characteristics include contact patch location, trajectory, and size.

11. The portable computer of claim 8, further comprising:
a keyboard disposed on a top surface of the base assembly, wherein the touchpad has a width that is substantially similar to a width of the keyboard or greater than a width of the keyboard.

12. The portable computer of claim 11, wherein the processor estimates a probability that the object detected on the surface of the touchpad is an unintentional contact based upon detecting when a user's hand is positioned over the keyboard using a sensor disposed between the keyboard and the touchpad.

13. The portable computer of claim 11, wherein the processor estimates a probability that the object detected on the surface of the touchpad is an unintentional contact based upon detecting when a user's hand is positioned over the keyboard using a sensor disposed in the display assembly.

14. A portable computer comprising:
a display assembly coupled to a base assembly;
a touchpad disposed on the base assembly, wherein a width of the touchpad is substantially similar to a width of the base assembly and the touchpad includes a plurality of predefined regions, and wherein the touchpad can detect an object in contact with a surface at any position on the touchpad within a first predefined region of the plurality of predefined regions; and
a processor coupled to the touchpad, wherein, in response to the processor determining that the contact is unintentional, the processor deactivates the first predefined region independently of a second predefined region of the plurality of predefined regions.

15. The portable computer of claim 14, wherein the processor estimates a probability that the object detected on the surface of the touchpad is an intentional or unintentional contact based upon determining the various characteristics of one or more contact patches on the touchpad.

16. The portable computer of claim 15, wherein the various characteristics include contact patch location, trajectory, and size.

17. The portable computer of claim 14, further comprising: a keyboard disposed on a top surface of the base assembly, wherein the touchpad has a width that is substantially similar to a width of the keyboard or greater than a width of the keyboard.

18. The portable computer of claim 17, wherein the processor estimates a probability that the object detected on the surface of the touchpad is an unintentional contact based upon detecting when a user's hand is positioned over the keyboard using a sensor disposed between the keyboard and the touchpad.

19. The portable computer of claim 17, wherein the processor estimates a probability that the object detected on the surface of the touchpad is an unintentional contact based upon detecting when a user's hand is positioned over the keyboard using a sensor disposed in the display assembly.

20. The portable computer of claim 14, wherein the touchpad comprises a capacitive sensor touchpad.

* * * * *